US009215483B2

(12) United States Patent
Cedervall et al.

(10) Patent No.: US 9,215,483 B2
(45) Date of Patent: Dec. 15, 2015

(54) POLICIES FOR CONTENT DOWNLOADING AND CONTENT UPLOADING

(75) Inventors: Mats Cedervall, Härnösand (SE); Jan Erik Lindquist, Älvsjö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 161 days.

(21) Appl. No.: 12/957,110

(22) Filed: Nov. 30, 2010

(65) Prior Publication Data

US 2011/0138431 A1 Jun. 9, 2011

Related U.S. Application Data

(60) Provisional application No. 61/267,989, filed on Dec. 9, 2009, provisional application No. 61/321,249, filed on Apr. 6, 2010.

(51) Int. Cl.
| | |
|---|---|
| H04N 7/173 | (2011.01) |
| H04N 21/239 | (2011.01) |
| H04N 21/238 | (2011.01) |
| H04N 21/2385 | (2011.01) |
| H04N 21/637 | (2011.01) |
| H04N 21/643 | (2011.01) |
| H04L 29/06 | (2006.01) |

(52) U.S. Cl.
CPC ........ *H04N 21/2393* (2013.01); *H04L 65/1006* (2013.01); *H04L 65/1016* (2013.01); *H04L 65/1043* (2013.01); *H04L 65/4076* (2013.01); *H04L 65/80* (2013.01); *H04N 21/238* (2013.01); *H04N 21/2385* (2013.01); *H04N 21/637* (2013.01); *H04N 21/64322* (2013.01)

(58) Field of Classification Search
USPC ................ 725/38, 116, 118, 95, 93
See application file for complete search history.

(56) References Cited

U.S. PATENT DOCUMENTS

| 2007/0107023 A1* | 5/2007 | Versteeg et al. ............. 725/95 |
| 2008/0229205 A1 | 9/2008 | Lee et al. |
| 2009/0060028 A1* | 3/2009 | Liu et al. ............. 375/240.01 |
| 2009/0063649 A1 | 3/2009 | Yamagishi |
| 2009/0178091 A1 | 7/2009 | Miyamoto et al. |

(Continued)

FOREIGN PATENT DOCUMENTS

| EP | 1 936 622 | 6/2008 |
| EP | 2 031 829 | 3/2009 |

(Continued)

OTHER PUBLICATIONS

International Search Report issued for PCT Application No. PCT/SE2010/051317, dated Apr. 6, 2011.
English Summary of Japanese Office Action mailed Jan. 24, 2014 in Japanese Application No. 2012-543049.
Supervising Editor Shigehiko Suzuki, "Easy NGN/IP network technique box—It makes you to be a professional of a network technique", first edition, The Telecommunications Association, Jun. 1, 2009, pp. 201-207; ISBN 978-4-88549-043-9.
Open IPTV Forum, Release 1 Specification, vol. 4—Protocols [V1.2]—[Aug. 28, 2012], 104 pages.

(Continued)

*Primary Examiner* — Jun Fei Zhong
(74) *Attorney, Agent, or Firm* — Nixon & Vanderhye, P.C.

(57) ABSTRACT

Methods and arrangements for setting up a policy for downloading of IPTV media content from a Content Server (5) to a User Equipment (1), and/or for uploading media content from a User Equipment to a Content Server. The policy is typically a bandwidth reservation, and the type of content download/upload will be included in an initial request from the User Equipment, e.g. in an SDP Offer, sent to an IPTV controlling node (4).

18 Claims, 9 Drawing Sheets

(56) References Cited

U.S. PATENT DOCUMENTS

| | | | |
|---|---|---|---|
| 2009/0225762 A1 | 9/2009 | Davidson et al. | |
| 2009/0260033 A1* | 10/2009 | Zhu et al. | 725/39 |
| 2010/0122281 A1* | 5/2010 | Wang et al. | 725/25 |
| 2011/0126241 A1* | 5/2011 | Beattie et al. | 725/62 |

FOREIGN PATENT DOCUMENTS

| | | |
|---|---|---|
| JP | 2004-153778 A | 5/2004 |
| JP | A 2009-159087 | 7/2009 |
| JP | A 2009-188981 | 8/2009 |
| WO | WO 2008/013385 | 1/2008 |
| WO | WO 2008/113693 | 9/2008 |
| WO | WO 2009024092 A1 * | 2/2009 |
| WO | WO 2009/051531 | 4/2009 |
| WO | WO 2009/080345 | 7/2009 |

OTHER PUBLICATIONS

Open IPTV Forum, Release 1 Specification, vol. 5—Declarative Application Environment [V1.2] —[Aug. 27, 2012], 289 pages.

English Translation of Chinese Search Report dated Feb. 11, 2014 Chinese Application No. 2010-80055870.9.

English language Translation of "Notice of Ground for Rejection," issued by the Japanese Patent Office in connection with Japanese Patent Application No. 2014-193031, dated Jul. 3, 2015.

"Use cases, requirements and working assumptions for IMS based PSS and MBMS User Services Extensions: Permanent Document," [online], Aug. 2009, 3GPP TSG-SA4 Meeting #55, Document: Tdoc S4-090692, [searched on May 8, 2014], InternetURL:http://www.3gpp.org/ftp/tsg_sa/WG4_CODEC/TSGS4_55/docs/S4-090692.zip.

* cited by examiner

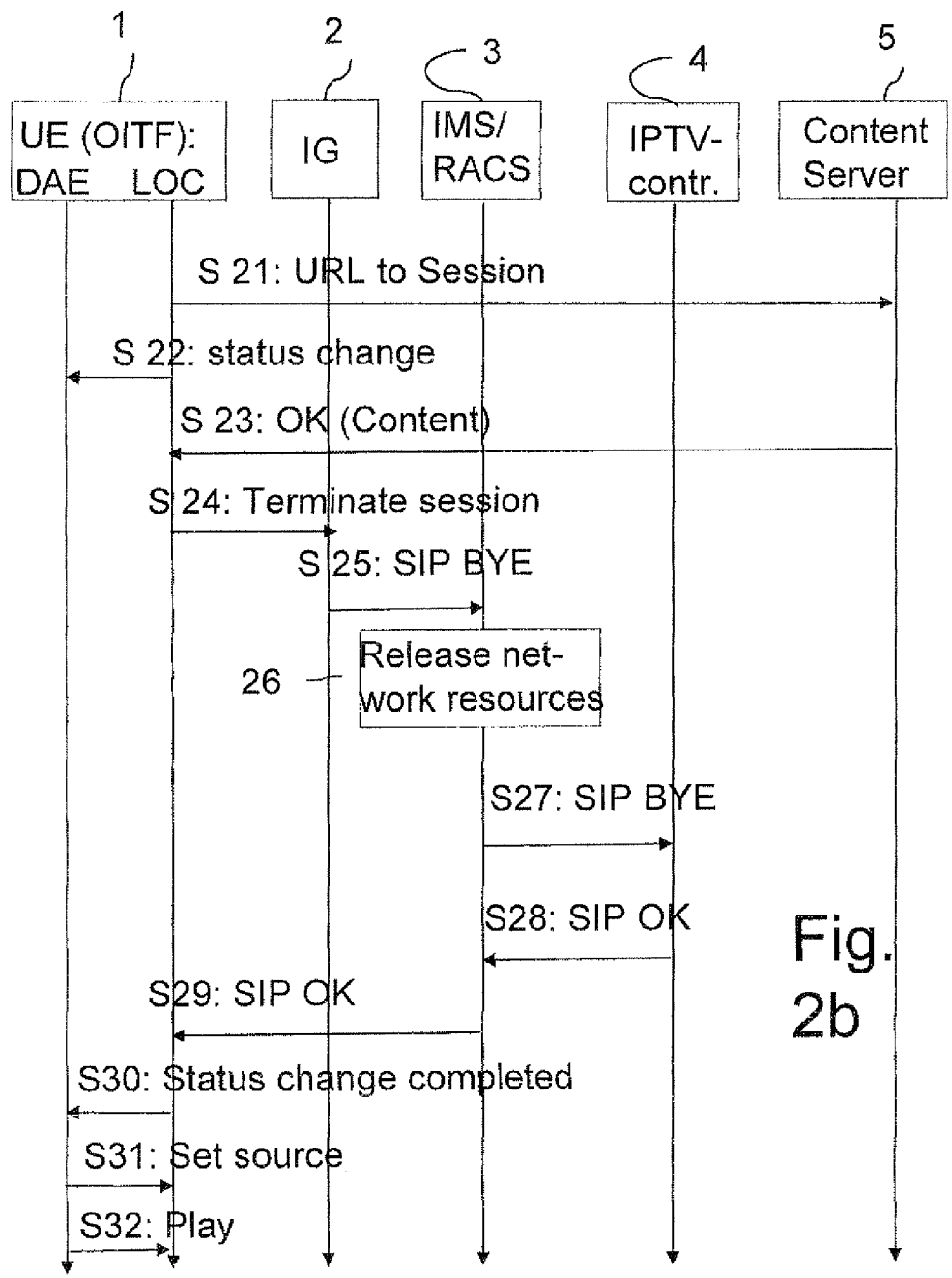

Method for an UE:

Method for an IPTV Controlling node:

POLICIES FOR CONTENT DOWNLOADING AND CONTENT UPLOADING

This application claims priority to U.S. Provisional Application No. 61/267,989, filed 9 Dec. 2009; and U.S. Provisional Application No. 61/321,249, filed 6 Apr. 2010, the entire contents of each of which are hereby incorporated by reference.

TECHNICAL FIELD

The technology described in this application relates to methods for a User Equipment and for an IPTV controlling node of uploading/downloading IPTV media content to or from a media content server, as well as to a User Equipment and an IPTV controlling node.

BACKGROUND

An end-user may access IPTV (Internet Protocol Television)-services from different types of UEs (User Equipments), such as e.g. a TV, a PC (Personal Computer) or a mobile phone, for example via the IMS (Internet Protocol Multimedia Sub-system), provided that the UE has suitable functionality, which may be specified e.g. according to the Open IPTV-Forum-specification.

Conventionally, a bandwidth can be reserved during set-up of a session, such as e.g. a Video on Demand-session, which is using a unicast stream, or a conventional television broadcast session, which is using a multicast stream. The bandwidth reservation will ensure that there is enough bandwidth both in "the last mile" to the subscriber and in the aggregation network in order to provide the user with an adequate experience, without any disruptions or disturbances of the service. Further, two sessions may together exceed the available bandwidth over the last mile. This will cause the packets in the two sessions to compete with each other, and result in that some packets will be discarded in both sessions. Thus, it is important that a new session is not allowed to affect the existing sessions, once a bandwidth has been reserved for the existing sessions.

Media content can be downloaded from a media content server to a UE, acting as a client terminal, e.g. by progressive downloading, in which the media content is stored in a local buffer in order to enable a play-out of the media file before the downloading is complete, by streaming downloading, in which the media content is streamed from the content server at the rate of the play-out and involving no storing, or by adaptive streaming downloading, in which the content can be downloaded at different bitrates. In a similar way, media content can be uploaded from a UE to a content server, and may subsequently be shared to other users using downloading.

However, a conventional HTTP progressive downloading of media content only supports a best-effort Quality of Service, i.e. no guaranteed QoS, and the bandwidth may not be the maximum bandwidth. Consequently, in case the resolution of the media content is high and the network has a limited bandwidth, the user experience of the play-out out may be poor. For example, media content downloaded from the well-known website YouTube is displayed while it is being downloaded, using only best-effort Quality of Service. If the resolution is limited and not too high, the available bandwidth may be sufficient, and the user experience of the played-out media content acceptable. However, otherwise the user experience may be poor.

Further, a correct playback of a progressively downloaded media file requires that the UE, i.e. the client terminal, is able to buffer a large amount of media content.

Thus, it still presents a problem to achieve an acceptable user-experience of played-out media content.

SUMMARY

It is an object of embodiments described hereinafter to address at least some of the issues outlined above, and this object and others are achieved by the method and the apparatus according to the appended independent claims, and by the embodiments according to the dependent claims.

Embodiments according to a first aspect provide a method for a User Equipment of setting up a policy for downloading IPTV-content from a Content Server, or a policy for uploading IPTV-content to a Content Server. The User Equipment generates a request comprising an indication of the type of content downloading or content uploading, and transmits the request to an IPTV-controlling node.

Embodiments according to a second aspect provide a method for an IPTV-controlling node of setting up a policy for downloading IPTV-content from a Content Server to a User Equipment, or uploading IPTV-content to a Content Server from a User Equipment. The IPTV controlling node receives a request from the User Equipment, the request comprising an indication of the type of content downloading or content uploading.

Embodiments according to a third aspect provide a User Equipment arranged to set up a policy for downloading IPTV-content from a Content Server, and/or for uploading IPTV-content to a Content Server. The User Equipment comprises a communication device provided with processing circuits, and is configured to generate a request comprising an indication of the type of content downloading and/or content uploading, and transmit the request to an IPTV-controlling node.

Embodiments according to a fourth aspect provide an IPTV-controlling node arranged to set up a policy for downloading IPTV-content from a Content Server to a User Equipment, and/or for uploading IPTV-content to a Content Server from a User Equipment. The IPTV controlling node comprises a communication device provided with processing circuits, and is configured to receive a request from the User Equipment, and the request comprises an indication of the type of content downloading and/or content uploading.

An advantage with exemplary embodiments is to enable a reliable downloading or uploading of media content, such that the user experience of the play-out is not affected e.g. by congestion in the network.

BRIEF DESCRIPTION OF THE DRAWINGS

The FIG. 1a is a block diagram illustrating an exemplary IMS IPTV-architecture for downloading and uploading of media content;

The FIG. 1b illustrates an OITF-enabled UE;

Figure 2A:
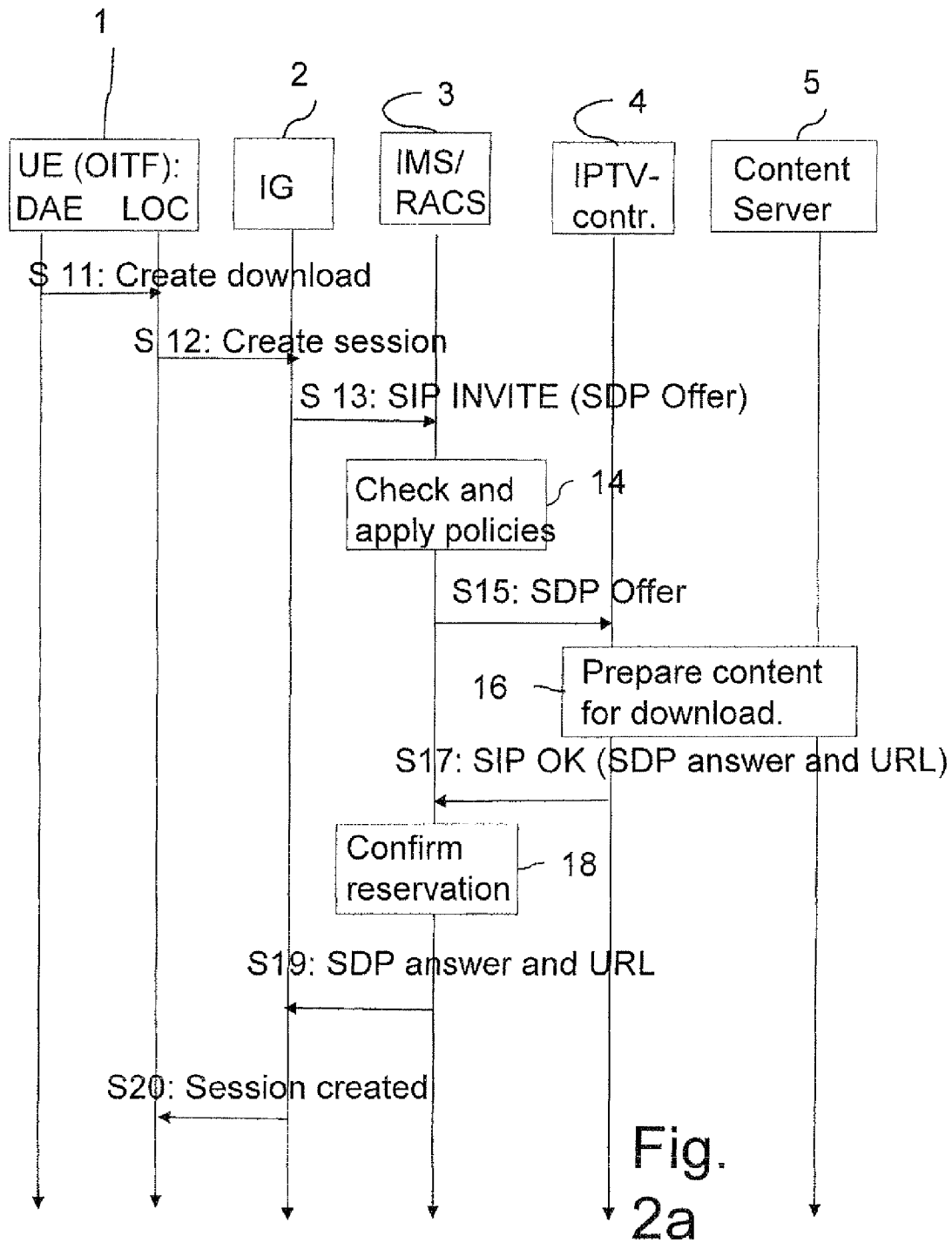
Figure 2C:
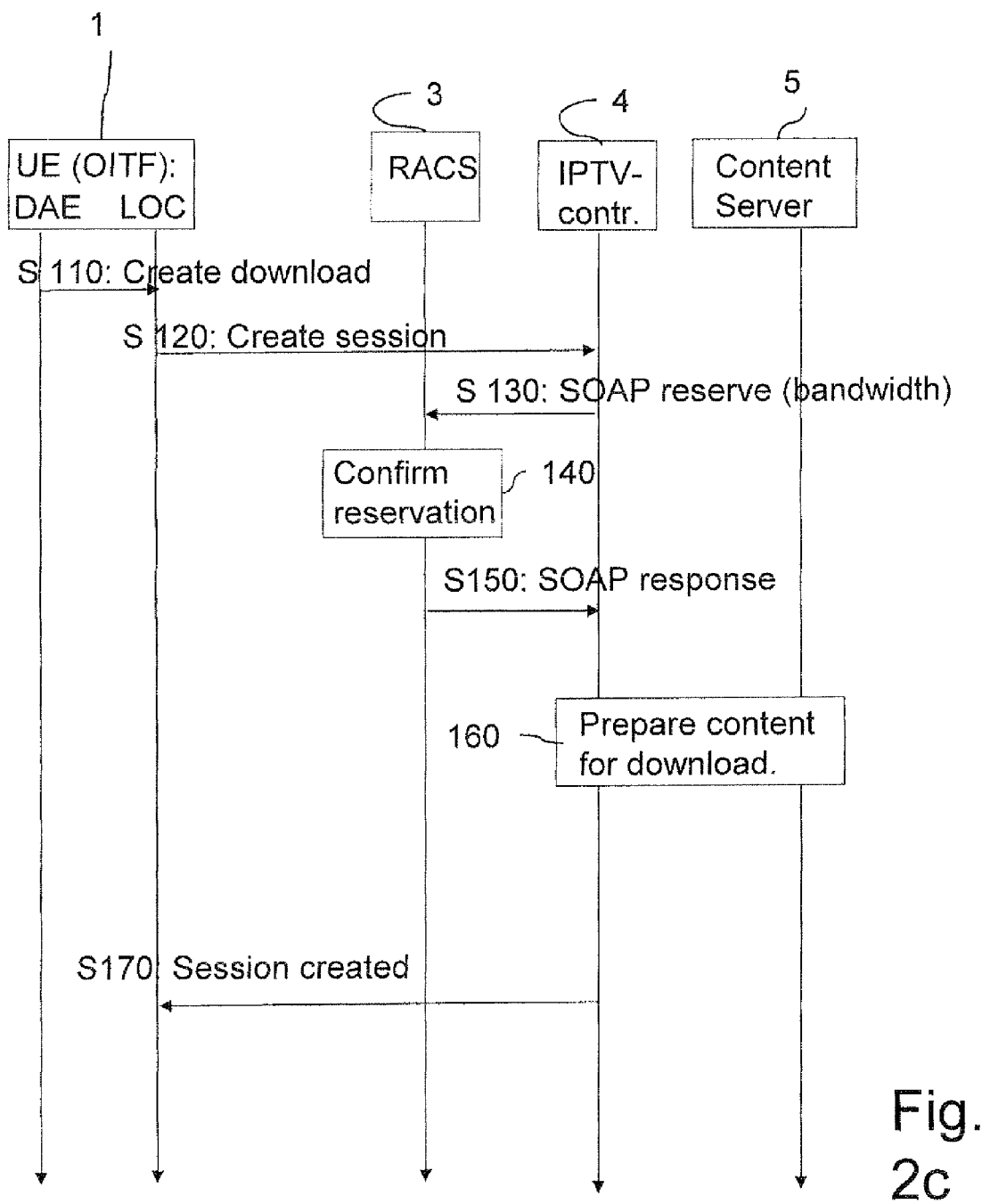
Figure 2D:
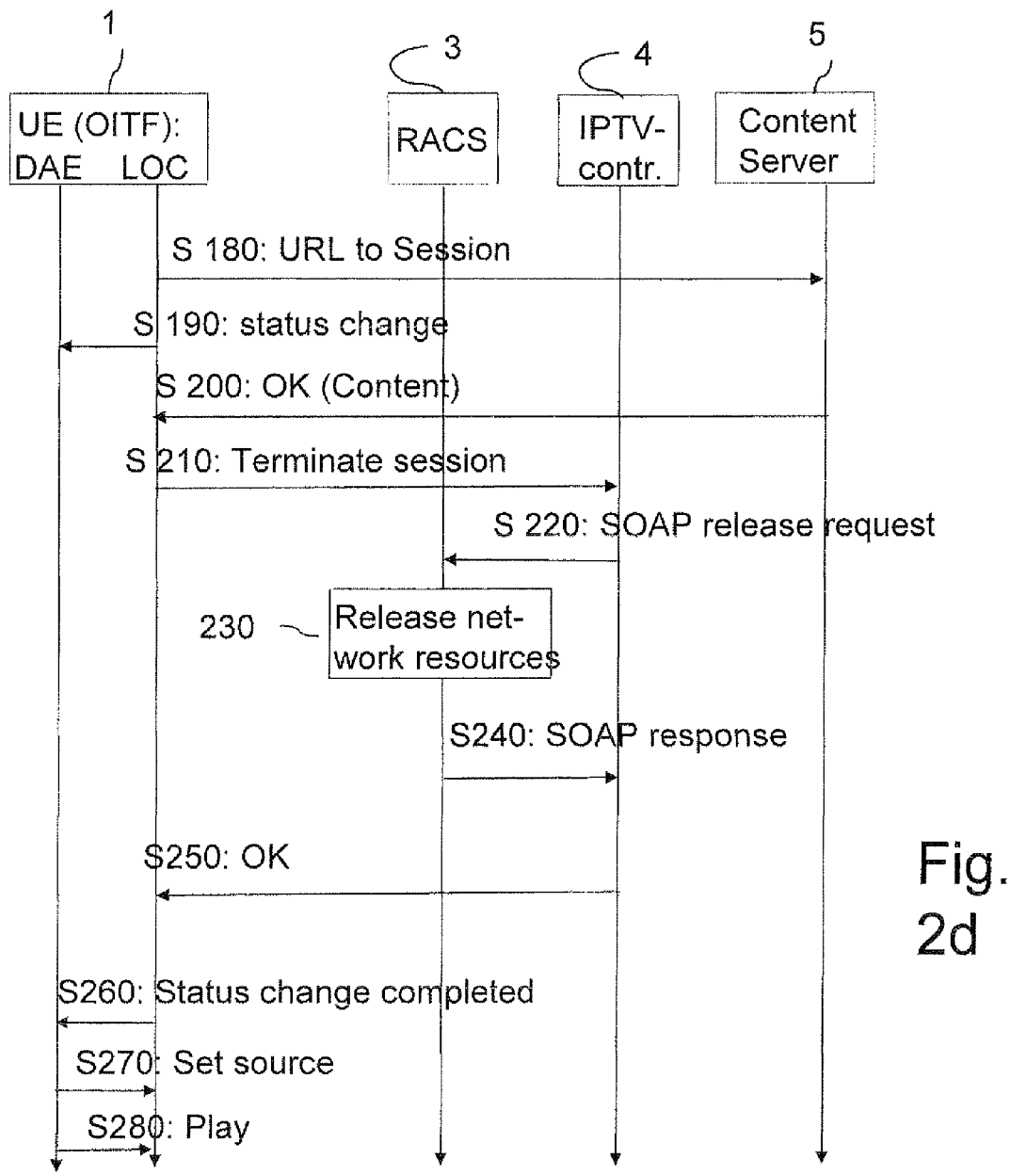
Figure 3:
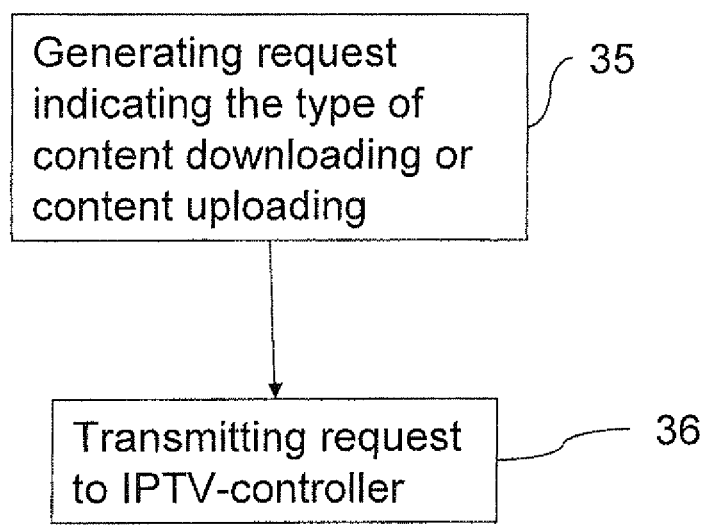
Figure 4:
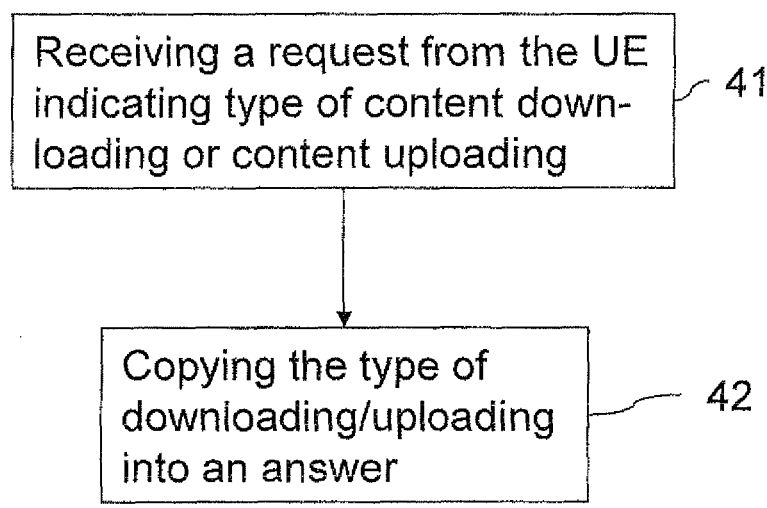
Figure 5:
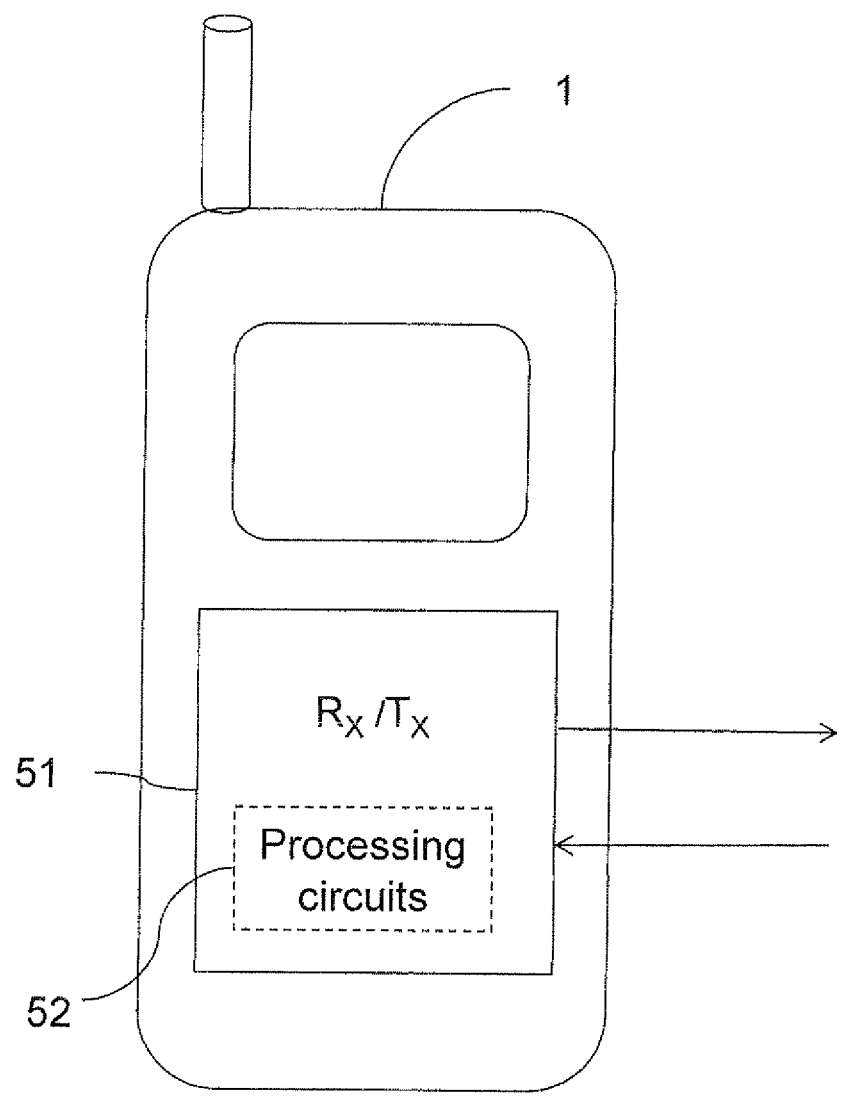

The FIGS. 2a and 2b are signalling diagrams schematically illustrating exemplary UE-initiated content downloading-sessions in an IMS IPTV-architecture;

The FIGS. 2c and 2d are signalling diagrams schematically illustrating exemplary UE-initiated content downloading-sessions for plain IPTV;

The FIG. 3 is a flow diagram schematically illustrating a method for a UE relating to content uploading or content downloading;

The FIG. 4 is a flow diagram schematically illustrating a method for an IPTV controlling node relating to content uploading or content downloading;

The FIG. 5 is a block diagram schematically illustrating an exemplary UE, and

Figure 6:
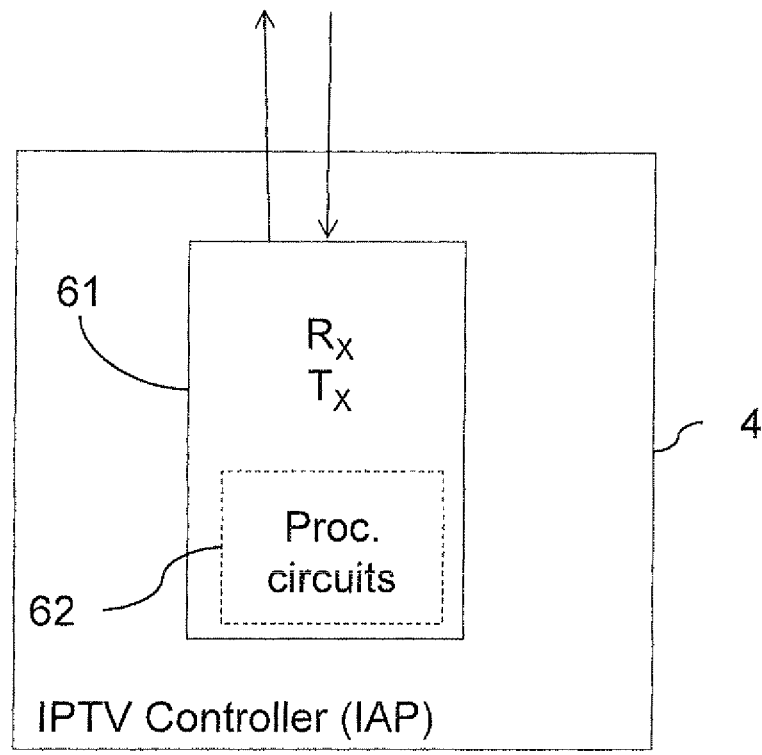

The FIG. 6 is a block diagram schematically illustrating an exemplary IPTV controlling node.

DETAILED DESCRIPTION

In the following, certain non-limiting and example embodiments are described with reference to the drawings. For the purpose of explanation and not limitation, specific details are set forth, such as particular scenarios, techniques, etc., However, it is apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the technology is primarily described in the form of methods and devices, it may also be embodied in a computer program product as well as in a system comprising a computer processor and a memory coupled to the processor, wherein the memory is encoded with one or more programs that may perform the functions disclosed herein.

A concept of embodiments described hereinafter is to indicate the type of content downloading or content uploading in an initial request from the user equipment, in order to set up policies for downloading and/or uploading of media content, e.g. to reserve a suitable bandwidth.

According to further embodiments, the type of content downloading or content uploading is indicated by a transfer type-attribute in the request, the attribute included in an SDP Offer contained in the initial request. According to another embodiment, a bandwidth attribute, proposing a bandwidth, is optionally included in the initial request.

Said transfer type-attribute indicates e.g. to the IMS and to the local transport policies that a session shall be set-up with specific requirements. For example, if the transfer type-attribute indicates a streaming downloading, and a specific bandwidth is indicated in a bandwidth attribute, a streaming downloading session shall be set up, with a guaranteed bandwidth according to the bandwidth indicated in the bandwidth attribute. Thus, a bandwidth indicated in the bandwidth attribute indicates an expected maximum bandwidth that is needed in order to obtain a smooth transmission.

According to a further embodiment, a request comprising a transport type-attribute and optionally a proposed bandwidth will be rejected in case the bandwidth that is required for the type of transport indicated in the request is not available in the network. If so, the user equipment may include a different transport type-attribute in next request.

In an IMS-based IPTV solution, according to exemplary embodiments, the QoS (Quality of Service) may be ensured, e.g. as defined according to the TISPAN RACS-architecture. The required signaling for linear TV and for Video-on-Demand are specified e.g. in TISPAN-specification and in the OITF (Open IPTV Forum)-specification.

The exemplary embodiments provide a tie between content downloading and content uploading and the above mentioned QoS-mechanisms provided e.g. by IMS/RACS, in order to ensure that a minimum transmission speed is available to support an uninterrupted viewing of media content during downloading, e.g. of the types progressive downloading, streaming downloading, and adaptive streaming downloading.

Thus, according to an example embodiment of the invention, the above-mentioned transfer type-attribute is included in an SDP Offer for content download, in order to set-up the policies specifically for the content download. This attribute enables a flexibility to control the local policies in IMS/RACS, such as e.g. to reserve bandwidth, to add a BGF (Border Gateway Function) in the path, or to select an appropriate priority in the access network. The RACS policies are set-up e.g. according to the standardized SPDF (Service-based Policy Decision Function.

Typically, the transport type for HTTP-content downloading is determined by the user equipment, based on the action of the end-user and the configuration of the user equipment. If the user selects a content to be viewed, and the user equipment is not configured to store the content, the content will be retrieved from the content server using streaming downloading of the content at the rate of play-out from the user equipment.

However, if the user equipment is configured to store the content, the content will be retrieved from the content server using progressive downloading, i.e. the content is stored or buffered in the user equipment, and played-out at the same time.

In adaptive streaming downloading, the end-user requests that the content shall be available as an adaptive stream, such that the content can be downloaded at different bitrates, according to a special scheme. For example, if the user equipment detects that the buffer is becoming empty, is may assume that there is a lack of bandwidth for a higher bit rate stream, and shift to a lower downloading bit rate.

As described above, the conventional HTTP content downloading is a best-effort type of transmission, and the speed of the downloading is limited by the available bandwidth. However, in order to achieve a differentiation between the different types of content downloading and content uploading, a transfer type-attribute is included in the initial request from the user equipment, according to example embodiments.

The different types of content downloading are differentiated with a slightly higher QoS than the best effort QoS, since the best effort QoS has no minimum transmission requirement.

As stated above, the described concepts are not only applicable for downloading but could be used for uploading, e.g. of user-generated content. The uploaded content may be subsequently shared with other users using downloading, and will therefore require a consistent transfer.

Figure 1A:
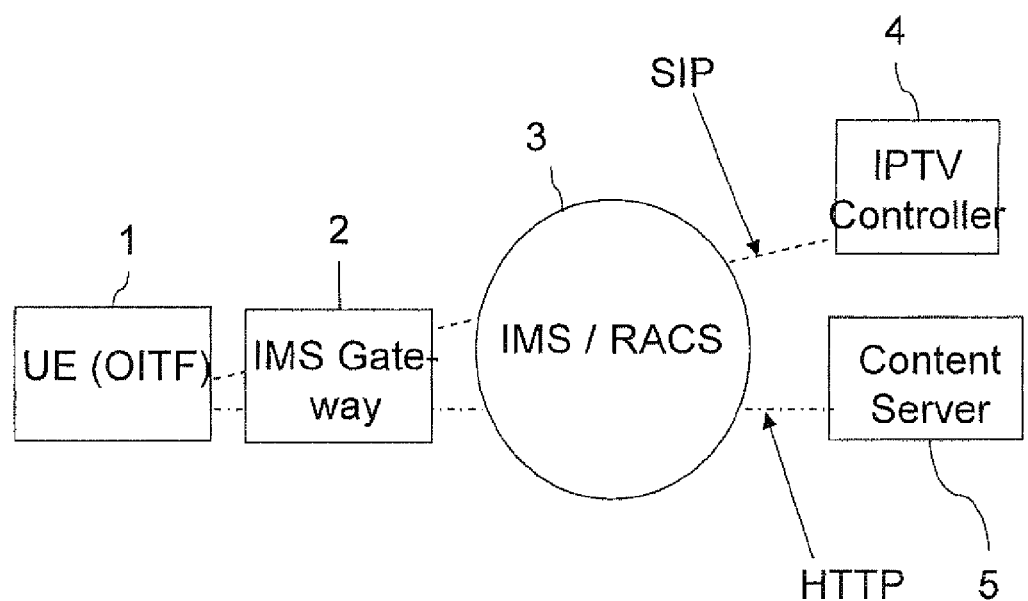

The FIG. 1a is a block diagram illustrating an exemplary IMS IPTV-architecture and the applicable protocols in IMS IPTV, i.e. the SIP (Session Initiation Protocol) and the HTTP (Hypertext Transfer Protocol), for downloading media from a content server to a UE, or uploading media content to the content server. The architecture comprises an OITF-enabled UE 1, an IMS Gateway 2, an IMS Media Server or Video-on-Demand pump, as indicated by the IMS/RACS-circle 3 in the figure, an IPTV Controller 4, and a Content Server 5 comprising a Media Control Function (MCF). The IPTV Controller 4 may comprise e.g. an IPTV Application Platform (IAP), as defined in the OpenIPTV Forum.

Figure 1B:
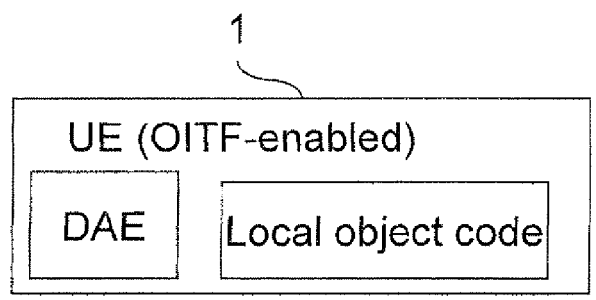

FIG. 1b is a block diagram schematically illustrating an OITF-enabled User Equipment 1, comprising functionality for the Declarative Application Environment (DAE), as defined in Open IPTV Forum-specification, as well as a local object code, the DAE comprising the browser of the UE.

More specifically, in an exemplary UE-initiated unicast content downloading session, an originating UE generates an initial INVITE-Request. The Request-URI (Uniform Resource Identifier) contains a downloading-content URI in a unicast locator, as well as in a TO-header, said identifier being retrieved from service selection information. Further, a FROM-header indicates the public user identity of the user.

An SDP Offer is included in the INVITE Request, in accordance with the media capabilities and the required bandwidth available for the content download session.

Thus, an exemplary typical SDP Offer at media level may include e.g. the following elements:

An "m=" line for an HTTP download, e.g. of the format: m=<media> <port> <transport> <fmt>:, with the media field having a value of "application", the port field being set to a value of 9, which is the discard port, and the transport field being set to TCP. Further, an fmt-parameter is included, and set to iptv_http, resulting in "m=application 9 tcp iptv_http".

An "a=setup" attribute set to "active", e.g. a=setup: active.

An "a=connection" attribute set as "new", e.g. a=connection: new.

A "c=" line included in the network type with the value set to IN, the address type set to IP4 or IP6, and IP address of the flow of the related HTTP channel, e.g. c=IN IP4 <IP_ADDRESS>).

According to an example embodiment, a "b="line of the SDP Offer may optionally contain a bandwidth attribute indicating a proposed bandwidth. If the user has fetched the bandwidth required for this particular content delivery channel during a service selection procedure, the bandwidth attribute at media level is set in the "b=" line to this value, e.g. b=AS:15000.

Accordingly, the MCF (Media Control Function) of the Content

Server will receive an SDP Offer, via the IPTV controller, that may contain a transfer type-attribute, as well as bandwidth attribute indicating a proposed bandwidth (in a "b=" line). The MCF of the Content Server will assist the IPTV controller in preparing the content for downloading or uploading, and copy a received transfer type-attribute into an SDP Answer, which is forwarded to the IPTV controller.

Additionally, according to exemplary embodiments, as described above, the type of content downloading is indicated in the initial INVITE-request, e.g. by a transfer type-attribute contained in the SDP Offer, such as a "fmtp:iptv_http transfer-type" attribute. According to a first example embodiment, the values that are applicable for the transfer type-attribute are "progressive", and "streaming" and "adaptive".

The "progressive" content downloading-type indicates content that is viewed during download, and the content is stored or buffered in the UE, requiring a comparatively large bandwidth.

The "streaming" content downloading type, e.g. HTTP streaming, indicates content that is viewed without storing, or with a limited buffering in the UE, similar to RTSP streaming.

The "adaptive" content downloading type, e.g. HTTP adaptive 10, streaming, indicates content that may be viewed at different bandwidth and with different quality.

The "b=" line is an optional bandwidth attribute, and indicates the bandwidth for the best quality streaming.

According to further exemplary embodiments, various other values of the transfer-type attribute could be used to indicate other proprietary types of content downloading, e.g. a=fmtp:iptv_http transfer-type=<transfer-type>.

FIGS. 2a and 2b show a signaling diagram illustrating an exemplary signaling sequence for a User Equipment 1 acting as a client terminal in an IMS IPTV-architecture. The figures illustrate the User Equipment downloading media content from a Content Server 5, the downloading involving a bandwidth reservation, according to example embodiments. The figures also illustrate the logical units that may be involved.

The UE (OITF)-box 1 indicates an OITF-enabled User Equipment, comprising functionality for the Declarative Application Environment (DAE), as defined in Open IPTV Forum, as well as a local object code (LOC). Further, the IG-box 2 corresponds to an IMS Gateway, the IMS/RACS-box 3 corresponding to an IMS Media Server or a Video-on-Demand pump, and the IPTV Controller 4 comprises an IPTV Application Platform (IAP). The Content Server 5 comprises a Media Controller Function (MCF).

In the signal S11 in FIG. 2a, the UE 1 initiates a downloading session, which is created in signal S12. In signal S13, a SIP INVITE is forwarded from the IMS Gateway 2 to the IMS Media Server 3, and further, in signal S15, forwarded to the IPTV Controller 4, the SIP INVITE including an SDP (Session Description Protocol)-Offer, and the content is prepared for downloading, in step 16, by the IPTV Controller 4 and the Content Server 5.

In the preceding step 14, the policies for downloading are checked and applied by the IMS/RACS, and a bandwidth reservation may be performed. This involves that the network topology in the access network is checked by the RACS in order to determine if the bandwidth required by the transport-type indicated in the SDP Offer of the SIP INVITE is available. If so, the bandwidth is reserved, and the SIP INVITE will be forwarded to the IPTV Controller, in signal S15. However, if the required bandwidth is not available, the SIP INVITE will be rejected, and not forwarded to the IPTV Controller. When the IPTV Controller receives a non-rejected SIP INVITE, the content will be prepared for downloading, in the above-mentioned step 16.

Next, in signal S17, the IPTV Controller will respond with an SDP answer, as well as with the URL to the session, which is forwarded to the IMS Gateway, in signal S19, and the bandwidth reservation is confirmed, in the preceding step 18. Thereafter, the session is created, in signal S20. The UE uses the received session URL for downloading the content from the Content Server 5, in signals S21, S22 and S23 in FIG. 2b. In signals S24-S30, the downloading session is terminated, including a release of network resources, in step 26, and eventually, in signals S31 and S32, the downloaded content is played-out.

The above described FIGS. 2a and 2b illustrate a downloading session. However, a similar signaling procedure may be used for an uploading session.

Other exemplary embodiments are directed to plain IPTV in a non-IMS network, using other protocols, e.g. the SOAP (Simple Object Access Protocol) or the DIAMETER-protocol, instead of the SIP.

Thus, the FIGS. 2c and 2d illustrate exemplary signalling diagrams for a plain IPTV-architecture, with no IMS Gateway, using the SOAP, and having an RACS interface 3 to the IPTV Controller 4. In signal S110 in FIG. 2c, the UE 1 initiates a downloading session, which is created in signal S120. In signal S130, the IPTV Controller issues a SOAP reserve bandwidth to the RACS interface. If the reservation is confirmed, in step 140, a SOAP response is sent to the IPTV controller, in signal S150. In step 160, the IPTV Controller prepares the content for downloading, and the session is created, in signal S170.

The UE uses a received session URL for downloading the content from the Content Server 5, in signals S180, S190 and S200 in FIG. 2d. In signals S210-S260, the downloading session is terminated, including a release of network resources, in step 230, and eventually, in signals S270 and S280, the downloaded content is played-out.

FIG. 3 is a flow diagram schematically illustrating a method for a User Equipment of setting up a policy for uploading or downloading of media content, according to example embodiments. In step 35, the UE generates a request indicating the type of content downloading or content uploading, and transmits the request to the IPTV controlling node, in step 36. According to a further embodiment, the policy is a bandwidth reservation, and the type is indicated by a transport type-attribute included in an SDP Offer of the initial request. According to a still further embodiment, the transfer type-attribute has one of the values "progressive", "streaming" or "adaptive", as defined above. The steps 35 and 36 in FIG. 3, when directed to downloading, basically correspond to the signals S11-S15 in FIG. 2a.

FIG. 4 is a flow diagram schematically illustrating a method for an IPTV Controlling Node of setting up a policy for uploading or downloading of media content, according to example embodiments. In step 41, the IPTV Controlling node receives a request from the UE, the request indicating the type of content downloading or content uploading. In step 42, the IPTV controlling node copies the type of downloading or uploading in an SDP answer, via the MCF (Media Control Function) of the content server. According to a further embodiment, the policy is a bandwidth reservation, which is set-up according to an expected transmission speed, based on the type of content downloading or uploading, as indicated by the transport type-attribute included in an SDP Offer of the initial request received from the UE in the above-mentioned step 41. According to a still further embodiment, the value of the transfer type-attribute is e.g. progressive, streaming or adaptive.

FIG. 5 is a block diagram illustrating a User Equipment 1, according to example embodiments. The UE 1 is e.g. an OITF-enabled mobile phone, a PC, or a TV, comprising a suitable user interface, and it is provided with processor circuits and appropriate software e.g. corresponding to a Declarative Application Environment (DAE), as defined in Open IPTV Forum, as well as a local object code. The software is further configured to perform the method according to example embodiments. The UE is also provided with a conventional communication device 51, comprising a transmitter, a receiver and processing circuits 52, in order to communicate with IPTV Controller, e.g. via an IMS Gateway and an IMS Media Server. According to an exemplary embodiment, the UE generates and transmits a request including an SDP Offer indicating the type of content downloading and/or content uploading.

FIG. 6 is a block diagram illustrating an exemplary IPTV controlling node 4, comprising an IPTV Application Platform (IAP). The IPTV controlling node is further provided with a communication device 61, comprising a transmitter, a receiver and processing circuits 62, and by means of the communication device and other appropriate hardware and software, the IPTV controlling node is configured to receive a request indicating the type of content download or content upload from a UE, e.g. in a transfer type-attribute included in an SDP Offer. According to a further embodiment, the communication device is configured to copy the transfer type attribute into an SDP answer, via the MCF (Media Control Function) contained in the content server. According to a preferred embodiment, the policy is a bandwidth reservation, and the IPTV controlling node is arranged to set-up the session with a bandwidth according to an expected transmission speed, based on a received transfer type-attribute.

The entities and units described above with reference to the FIGS. 5 and 6 are logical units, which do not necessarily correspond to separate physical units.

Thus, according to embodiments of a method for a User Equipment directed to downloading of media content, the User Equipment 1 sets up a policy for downloading IPTV-content from a server by generating a request comprising an indication of the content downloading-type, and transmitting the request to an IPTV-controller 4.

According to exemplary embodiments, the policy is a bandwidth reservation, and the content download-type is indicated by a standardized transfer type-attribute, e.g. progressive, which denotes a progressive downloading, streaming, which denotes a streaming downloading, or adaptive, which denotes an adaptive streaming downloading.

According to further exemplary embodiments, the IPTV is IMS-based, and the indication of the content download type is contained in an SDP Offer included in the request. Further, the SDP Offer may comprise a bandwidth attribute indicating a proposed bandwidth.

According to a still further embodiment, the User Equipment will receive a rejection of the request, if the bandwidth required for the transport-type indicated by the transport type-attribute is not available, and the User Equipment may generate a request comprising a different transport type-attribute upon receiving the rejection.

According to embodiments of a similar method for a User Equipment directed to uploading, the User Equipment 1 sets up a policy for uploading IPTV-content to a server, by generating a request comprising an indication of the content uploading-type, and transmitting the request to an IPTV-controller 4.

According to further exemplary embodiments, the policy is a bandwidth reservation, which is set up according to an expected transmission speed, and the content uploading-type is indicated by a standardized transfer type-attribute, e.g. "progressive", "streaming" or "adaptive", the attributes denoting a progressive uploading, a streaming uploading, and an adaptive streaming uploading, respectively.

According to other exemplary embodiments, the IPTV is IMS-based, and the indication of the content uploading-type is contained in an SDP Offer included in the request. Further, the SDP Offer may comprise a bandwidth attribute indicating a proposed bandwidth.

According to a still further embodiment, the User Equipment will receive a rejection of the request, if the bandwidth required for the transport-type indicated by the transport type-attribute is not available, and the User Equipment may generate a request comprising a different transport type-attribute upon receiving the rejection.

A User Equipment communicates with an IPTV-controlling node in order to set up the policies for uploading and downloading. According to embodiments of a method for an IPTV controlling node 4 directed to downloading, the IPTV-controlling node 4 sets up a policy for downloading IPTV-content from the content server 5 to a User Equipment 1, the IPTV controller receiving a request from the User Equipment, the request comprising an indication of the of content download-type.

According to further exemplary embodiments, the policy is a bandwidth reservation, which is set up by the IPTV controlling node 4 according to an expected transmission speed, based on the received indication of the type of content downloading. Said content downloading-type is indicated by a standardized transfer type-attribute, e.g. "progressive", "streaming" or "adaptive", the attributes denoting progressive uploading, streaming uploading, and an adaptive streaming uploading, respectively.

According to still other embodiments, the IPTV is IMS-based, and the indication of the content download type is contained in an SDP Offer included in the request received from the UE. Further, the SDP Offer may comprise a bandwidth attribute indicating a proposed bandwidth, and the indication of the content download type may be copied into an SDP answer.

According to embodiments of a method for an IPTV controlling node directed to uploading, the IPTV-controlling node 4 sets up a policy for uploading IPTV-content from a UE 1 to a content server 5, the IPTV controller receiving a request from the User Equipment, the request comprising an indication of the content uploading-type.

According to exemplary embodiments, the policy is a bandwidth reservation, which is set-up according to an expected transmission speed, based on the received indication of the type of content uploading. Said content uploading-type is indicated by a standardized transfer type-attribute, e.g. "progressive", "streaming", or "adaptive", the attributes denoting a progressive uploading, a streaming uploading, and an adaptive streaming uploading, respectively.

According to further exemplary embodiments, the IPTV is IMS-based, and the indication of the content uploading-type is contained in an SDP Offer included in the request. Further, the SDP Offer comprises a bandwidth attribute indicating a proposed bandwidth, and the indication of the content upload type is copied into an SDP answer.

According to embodiments of a User Equipment 1, the UE is arranged to set up a policy for downloading IPTV-content from a content server 5, the User Equipment comprising a communication device 61 provided with processing circuits 62, and is configured to generate a request comprising an indication of the content downloading-type, and transmit the request to an IPTV-controlling node 4.

Additionally, according to embodiments of a User Equipment, the User Equipment 1 is arranged to set up a policy for uploading IPTV-content to a server 5, the User Equipment comprising a communication device 61 provided with processing circuits 62, and is configured to generate a request comprising an indication of the content uploading-type, and transmit the request to an IPTV-controlling node.

Thus, a User Equipment according to the invention is preferably arranged to set up policies for both downloading and uploading, but may alternatively be arranged to set up policies for either downloading or uploading.

According to further exemplary embodiments of said User Equipment, the policy is a bandwidth reservation, and the content downloading type and/or the content uploading-type is indicated by a standardized transfer type-attribute, e.g. "progressive", "streaming", or "adaptive", the attributes denoting a progressive uploading, a streaming uploading, and an adaptive streaming uploading, respectively.

According to still further exemplary embodiments, the IPTV is IMS-based, and the indication of the transfer type attribute is contained in an SDP Offer included in the request. Additionally, the SDP Offer further comprises a proposed bandwidth, and the UE is OITF-enabled.

Similarly as regarding the above-described exemplary methods, a User Equipment is configured to communicate with an IPTV-controlling node for setting up the policies for uploading and downloading. According to embodiments of an IPTV-controlling node 4, the IPTV-controlling node 4 is arranged to set up a policy for downloading IPTV-content from a content server 5 to a User Equipment 1, the IPTV-controlling node comprising a communication device 51 provided with processing circuits 52, and is configured to receive a request from the User Equipment, the request comprising an indication of the content downloading-type.

Additionally, according to embodiments of an IPTV-controlling node 4, the IPTV controlling node is arranged to set up a policy for uploading IPTV-content from a content server 5 to a User Equipment 1, said node comprising a communication device 51 provided with processing circuits 52, and is configured to receive a request from the User Equipment, the request comprising an indication of the content uploading-type.

According to another exemplary embodiment, the policy is a bandwidth reservation, and the IPTV controlling node is arranged to set up the bandwidth reservation according to an expected transmission speed, based on the received indication of type of content downloading and/or content uploading. Said content downloading-type and/or content uploading-type is indicated by a standardized transfer type-attribute, e.g. "progressive", "streaming", or "adaptive", the attributes denoting a progressive uploading, a streaming uploading, and an adaptive streaming uploading, respectively According to still further exemplary embodiments, the IPTV is IMS-based, and the transfer-type attribute is contained in an SDP Offer included in the request, the SDP Offer further comprising a proposed bandwidth.

The IPTV-controlling node may be further arranged to copy a received indication of the content uploading-type and/or the content downloading-type into an SDP answer, via the MCF of the content server.

Thus, an IPTV-Controlling node according to the embodiments is preferably arranged to set up policies for both downloading and uploading, but may alternatively be arranged to set up policies for either downloading or uploading.

As further described in connection with the FIGS. 2c and 2d, exemplary embodiments are applicable to a non-IMS network, e.g. in so-called plain or traditional IPTV. However, in case of a non-IMS network, a separate protocol, similar to the SIP, is required in order to create a session, with the backend to allocate and de-allocate the bandwidth, e.g. the SOAP or the DIAMETER-protocol. Alternatively, a new HTTP header could be added, with a proposed bandwidth and the transfer type included, or the information could be encapsulated in a HTTP Request URI, without requiring any separate protocol.

Furthermore, the above mentioned and described embodiments are only given as examples and should not be limiting. Other solutions, uses, objectives, and functions within the scope of the claims should be apparent for the person skilled in the art.

Abbreviations
OITF=Open IPTV Forum
SDP=Session Descriptive Protocol
MCF=Media Control Function
IAP=IPTV Application Platform
RACS=Resource and Admission Control Sub-system
SPDF=Service-based Policy Decision Function
DAE=Declarative Application Environment
QoS=Quality of Service
URI=Uniform Resource Identifier
SOAP=Simple Object Access Protocol
HTTP=Hypertext Transfer Protocol
SIP=Session Initiation Protocol

The invention claimed is:

1. A method for a User Equipment (UE) of setting up a policy for downloading Internet Protocol Television (IPTV)-content from a Content Server, the method comprising:
generating a request including an indication of one of three supported transfer types of content downloading selected by a user equipment for the content downloading and a bandwidth attribute including a proposed bandwidth for the content downloading based on the indicated transfer type selected by the user equipment for the content downloading,
wherein the three supported transfer types of content downloading the user equipment selects from include a progressive content loading type, a streaming content loading type, and an adaptive content loading type,
wherein the progressive content loading type indicates media content that is stored in the UE and viewed during downloading to enable play-out of the media content before the downloading is complete, the streaming content loading type indicates media content is streamed from the content server at a rate of play-out at the UE without storing the streamed content in the UE, and the adaptive content loading type indicates content for viewing at different bandwidths and with different qualities, and
wherein the transfer type is indicated by a media transfer type-attribute included in the request having a media transfer type-attribute value corresponding to the selected one of the progressive, streaming, and adaptive types of content downloading, and
transmitting the request to an IPTV-controlling node.

2. A method according to claim 1, wherein the policy is a bandwidth reservation.

3. A method according to claim 1, wherein the IPTV is IMS-based, and the transfer type-attribute is contained in an SDP Offer included in the request.

4. A method according to claim 2, further comprising the User Equipment receiving a rejection of the request, if the bandwidth required by the transport type-attribute is not available.

5. A method according to claim 4, comprising generating a request containing a different transport type-attribute, if a rejection is received.

6. A method for an Internet Protocol Television (IPTV)-controlling node of setting up a policy for downloading IPTV-content from a Content Server to a User Equipment, the method comprising:
receiving a request from the User Equipment, the request including an indication of one of three supported transfer types of content downloading selected by a user equipment for the content downloading and a bandwidth attribute including a proposed bandwidth for the content downloading based on the indicated transfer type selected by the user equipment for the content downloading,
wherein the three supported transfer types of content downloading that the user equipment selects from include a progressive content loading type, a streaming content loading type, and an adaptive content loading type,
wherein the progressive content loading type indicates media content that is stored in the UE and viewed during downloading to enable play-out of the media content before the downloading is complete, the streaming content loading type indicates media content is streamed from the content server at a rate of play-out at the UE without storing the streamed content in the UE, and the adaptive content loading type indicates content for viewing at different bandwidths and with different qualities, and
wherein the transfer type is indicated by a media transfer type-attribute included in the request having a media transfer type-attribute value corresponding to the selected one of the progressive, streaming, and adaptive types of content downloading.

7. A method according to claim 6, wherein the policy is a bandwidth reservation, which is set up according to an expected transmission speed, based on the type of content downloading of content uploading.

8. A method according to claim 6, further comprising:
copying the transfer type-attribute from an SDP Offer included in the request, into an SDP answer included in a response, via an MCF (Media Control Function) of the Content Server.

9. A User Equipment arranged to set up a policy for downloading Internet Protocol Television (IPTV)-content from a Content Server, the User Equipment comprising a communication device provided with processing circuits, and being configured to:
generate a request including an indication of one of three supported transfer types of content downloading selected by a user equipment for the content downloading and a bandwidth attribute including a proposed bandwidth for the content downloading based on the indicated transfer type selected by the user equipment for the content downloading,
wherein the three supported transfer types of content downloading the user equipment selects from include a progressive content loading type, a streaming content loading type, and an adaptive content loading type,
wherein the progressive content loading type indicates media content that is stored in the UE and viewed during downloading to enable play-out of the media content before the downloading is complete, the streaming content loading type indicates media content is streamed from the content server at a rate of play-out at the UE without storing the streamed content in the UE, and the adaptive content loading type indicates content for viewing at different bandwidths and with different qualities, and
wherein the transfer type is indicated by a media transfer type-attribute included in the request having a media transfer type-attribute value corresponding to the selected one of the progressive, streaming, and adaptive types of content downloading, and
transmit the request to an IPTV-controlling node.

10. A UE according to claim 9, wherein the policy is a bandwidth reservation.

11. A UE according to claim 10, wherein the IPTV is IMS-based and the transfer type-attribute is contained in an SDP Offer included in the request.

12. An Internet Protocol Television (IPTV)-controlling node arranged to set up a policy for downloading IPTV-content from a Content Server to a User Equipment, the IPTV controlling node comprising a communication device provided with processing circuits, and being configured to:
receive a request sent from the User Equipment, via the radio transceiver, the request including an indication of one of three supported transfer types of content downloading selected by a user equipment for the content downloading and a bandwidth attribute including a proposed bandwidth for the content downloading based on the indicated transfer type selected by the user equipment for the content downloading, wherein the three supported transfer types of content downloading the user equipment selects from include a progressive content loading type, a streaming content loading type, and an adaptive content loading type, wherein the progressive content loading type indicates media content that is stored in the UE and viewed during downloading to enable play-out of the media content before the downloading is complete, the streaming content loading type indicates media content is streamed from the content server at a rate of play-out at the UE without storing the streamed content in the UE, and the adaptive content loading type indicates content for viewing at different bandwidths and with different qualities, and wherein the transfer type is indicated by a media transfer type-attribute included in the request having a media transfer type-attribute value corresponding to the selected one of the progressive, streaming, and adaptive types of content downloading.

13. An IPTV controlling node according to claim 12, wherein the policy is bandwidth reservation, which is set up according to an expected transmission speed, based on the type of content downloading.

14. An IPTV controlling node according to claim 12, further configured to copy the transfer type attribute from an SDP Offer included in the request into an SDP answer included in a response, via an MCF (Media Control Function) of the Content Server.

15. An IPTV controlling node according to claim 12, wherein the User Equipment includes a radio transceiver and the IPTV controlling node is configured to receive the request sent from the User Equipment via the radio transceiver.

16. A UE according to claim 9, wherein the User Equipment includes a radio transceiver and the transmitter includes a radio transmitter.

17. The method according to claim 6, wherein the User Equipment includes a radio transceiver.

18. The method according to claim 1, wherein the User Equipment includes a radio transceiver with a radio transmitter for transmitting the request.

\* \* \* \* \*

UNITED STATES PATENT AND TRADEMARK OFFICE
CERTIFICATE OF CORRECTION

PATENT NO. : 9,215,483 B2
APPLICATION NO. : 12/957110
DATED : December 15, 2015
INVENTOR(S) : Cedervall et al.

It is certified that error appears in the above-identified patent and that said Letters Patent is hereby corrected as shown below:

In the drawings:

In Fig. 6, Sheet 9 of 9, delete " 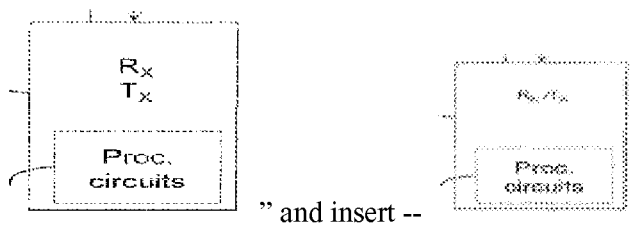 " and insert -- -- , therefor.

In the specification:

In Column 3, Line 5, delete "UE, and" and insert -- UE; and --, therefor.

In Column 3, Line 15, delete "etc.," and insert -- etc. --, therefor.

In Column 4, Line 31, delete "scheme. Fbr" and insert -- scheme. For --, therefor.

In Column 5, Lines 35-41, delete "Server will.........controller." and insert the same at Line 34, after "Content", as a continuation Paragraph.

In Column 5, Line 57, delete "adaptive 10," and insert -- adaptive --, therefor.

In Column 6, Lines 8-14, delete "Environment.........(MCF)." and insert the same at Line 7, after "Application", as a continuation Paragraph.

In Column 6, Lines 18-23, delete "INVITE is.........Server 5." and insert the same at Line 17, after "SIP", as a continuation Paragraph.

Signed and Sealed this
Twenty-first Day of June, 2016

Michelle K. Lee
*Director of the United States Patent and Trademark Office*

CERTIFICATE OF CORRECTION (continued)
U.S. Pat. No. 9,215,483 B2

In the specification:

In Columns 7 & 8, Lines 65-67 & Lines 1-3, delete "MCF.........attribute." and insert the same at Column 7, Line 64, after "the", as a continuation Paragraph.

In Column 10, Line 24, delete "respectively" and insert -- respectively. --, therefor.